US012597413B2

(12) United States Patent
Park et al.

(10) Patent No.: US 12,597,413 B2
(45) Date of Patent: Apr. 7, 2026

(54) ELECTRONIC DEVICE AND CONTROL METHOD THEREOF

(71) Applicant: SAMSUNG ELECTRONICS CO., LTD., Suwon-si (KR)

(72) Inventors: Soyoon Park, Suwon-si (KR); Sungjun Lim, Suwon-si (KR); Jonghyun Kim, Suwon-si (KR); Jiwan Kim, Suwon-si (KR); Hakjung Kim, Suwon-si (KR); Hyunkyung Kim, Suwon-si (KR); Sohyun Park, Suwon-si (KR); Indong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 455 days.

(21) Appl. No.: 18/105,011

(22) Filed: Feb. 2, 2023

(65) Prior Publication Data

US 2023/0197059 A1 Jun. 22, 2023

Related U.S. Application Data

(63) Continuation of application No. PCT/KR2022/012876, filed on Aug. 29, 2022.

(30) Foreign Application Priority Data

Oct. 15, 2021 (KR) ........................ 10-2021-0137491
Apr. 14, 2022 (KR) ........................ 10-2022-0046172

(51) Int. Cl.
*G10L 13/08* (2013.01)
*G10L 15/00* (2013.01)
(Continued)

(52) U.S. Cl.
CPC .......... *G10L 13/086* (2013.01); *G10L 15/005* (2013.01); *G10L 15/02* (2013.01); *G10L 15/26* (2013.01)

(58) Field of Classification Search
CPC ..... G10L 13/086; G10L 15/005; G10L 15/02; G10L 15/26; G10L 13/00; G06F 40/58
(Continued)

(56) References Cited

U.S. PATENT DOCUMENTS 8,442,311 B1* 5/2013 Hobbs ........................ G06T 9/00
382/166
9,026,615 B1* 5/2015 Sirton .................. H04N 19/593
709/217
(Continued)

FOREIGN PATENT DOCUMENTS

EP 3 267 328 A1 1/2018
EP 3 540 611 A1 9/2019
(Continued)

OTHER PUBLICATIONS

Extended European Search Report Dated Sep. 12, 2024, issued by the European Patent Office in European Application No. 22881199.8.
(Continued)

*Primary Examiner* — Thuykhanh Le
(74) *Attorney, Agent, or Firm* — Sughrue Mion, PLLC

(57) ABSTRACT

An electronic apparatus includes: a microphone; a communication interface including communication circuitry; a memory configured to store a first encoder corresponding to a first language and a first decoder corresponding to the first language; and a processor configured to: based on a user voice in the first language being received through the microphone, acquire text in the first language corresponding to the user voice, acquire a first feature vector by inputting the text in the first language to the first encoder, control the communication interface to transmit the first feature vector to an external device, and based on a second feature vector being received from the external device through the communication interface, acquire text in the first language
(Continued)

corresponding to the second feature vector by inputting the second feature vector to the first decoder.

18 Claims, 10 Drawing Sheets

(51) Int. Cl.
*G10L 15/02*          (2006.01)
*G10L 15/26*          (2006.01)

(58) Field of Classification Search
USPC .......................................................... 704/2
See application file for complete search history.

(56)                    References Cited

U.S. PATENT DOCUMENTS

| | | | | |
|---|---|---|---|---|
| 9,542,611 | B1* | 1/2017 | Mikhael | H04N 19/139 |
| 9,614,969 | B2 | 4/2017 | Aue et al. | |
| 9,704,270 | B1* | 7/2017 | Main | G06T 15/60 |
| 10,015,499 | B1* | 7/2018 | Hobbs | G06V 30/413 |
| 10,116,963 | B1* | 10/2018 | Bhattacharyya | G06F 3/04883 |
| 10,445,431 | B1* | 10/2019 | Lev-Tov | G06F 40/253 |
| 10,599,774 | B1* | 3/2020 | Luo | G06N 3/0455 |
| 10,637,826 | B1* | 4/2020 | Luo | G06N 3/047 |
| 10,867,136 | B2 | 12/2020 | Lee et al. | |
| 10,891,446 | B2 | 1/2021 | Hodge | |
| 10,929,618 | B2* | 2/2021 | Ishikawa | G06F 40/247 |
| 11,205,444 | B2* | 12/2021 | Bui | G06F 17/16 |
| 11,302,331 | B2 | 4/2022 | Gowda et al. | |
| 11,314,951 | B2 | 4/2022 | Kim et al. | |
| 11,429,834 | B1* | 8/2022 | Xue | G06N 3/09 |
| 11,568,863 | B1* | 1/2023 | Sarikaya | G10L 15/02 |
| 11,631,007 | B2* | 4/2023 | Zhao | G06N 3/045 |
| | | | | 704/9 |
| 11,682,400 | B1* | 6/2023 | Liu | G06F 40/20 |
| | | | | 704/270 |
| 11,721,330 | B1* | 8/2023 | Pandey | G10L 15/32 |
| | | | | 704/275 |
| 11,741,971 | B1* | 8/2023 | You | H04L 63/107 |
| | | | | 704/201 |
| 11,776,557 | B2 | 10/2023 | Yun et al. | |
| 11,830,476 | B1* | 11/2023 | Karanasou | G06N 3/0455 |
| 11,886,813 | B2* | 1/2024 | Courtland | G06N 3/0495 |
| 12,101,516 | B1* | 9/2024 | Theckyam | G06F 40/58 |
| 12,190,871 | B1* | 1/2025 | Siagian | G06Q 30/0277 |
| 12,248,754 | B2* | 3/2025 | Mao | G10L 15/1815 |
| 12,323,650 | B2* | 6/2025 | Zhu | G10L 13/00 |
| 12,493,756 | B2* | 12/2025 | Tu | G06F 40/58 |
| 2002/0161578 | A1* | 10/2002 | Saindon | G06F 40/58 |
| | | | | 704/235 |
| 2003/0004720 | A1* | 1/2003 | Garudadri | G10L 15/30 |
| | | | | 704/E15.047 |
| 2003/0038798 | A1* | 2/2003 | Besl | G06T 17/005 |
| | | | | 345/426 |
| 2004/0049389 | A1* | 3/2004 | Marko | G10L 13/00 |
| | | | | 704/260 |
| 2004/0201647 | A1* | 10/2004 | Jackson Pulver | B41J 2/0451 |
| | | | | 347/54 |
| 2004/0217956 | A1* | 11/2004 | Besl | G06T 15/00 |
| | | | | 345/419 |
| 2004/0225501 | A1* | 11/2004 | Cutaia | G10L 13/033 |
| | | | | 704/260 |
| 2005/0086702 | A1* | 4/2005 | Cormack | H04N 21/4856 |
| | | | | 725/135 |
| 2005/0091051 | A1* | 4/2005 | Moriya | G10L 19/0017 |
| | | | | 704/229 |
| 2006/0041431 | A1* | 2/2006 | Maes | H04L 65/65 |
| | | | | 704/E15.047 |
| 2006/0083302 | A1* | 4/2006 | Han | H04N 19/86 |
| | | | | 375/E7.199 |
| 2006/0165302 | A1* | 7/2006 | Han | H04N 19/615 |
| | | | | 375/E7.123 |
| 2006/0165304 | A1* | 7/2006 | Lee | H04N 19/86 |
| | | | | 375/E7.186 |
| 2006/0182179 | A1* | 8/2006 | Han | H04N 19/61 |
| | | | | 375/240.03 |
| 2006/0215762 | A1* | 9/2006 | Han | H04N 19/137 |
| | | | | 375/E7.153 |
| 2007/0005795 | A1* | 1/2007 | Gonzalez | G06F 16/40 |
| | | | | 375/E7.006 |
| 2007/0047644 | A1* | 3/2007 | Lee | H04N 19/134 |
| | | | | 375/E7.176 |
| 2007/0088547 | A1* | 4/2007 | Freedman | G10L 19/0018 |
| | | | | 704/235 |
| 2008/0031527 | A1* | 2/2008 | Arcas | H03M 7/40 |
| | | | | 375/E7.198 |
| 2009/0125295 | A1* | 5/2009 | Drewes | G06F 40/58 |
| | | | | 379/202.01 |
| 2010/0039498 | A1* | 2/2010 | Liu | G09B 21/006 |
| | | | | 704/235 |
| 2011/0122003 | A1* | 5/2011 | Van Den Boom | H04N 19/192 |
| | | | | 341/106 |
| 2011/0149035 | A1* | 6/2011 | Tsukagoshi | H04N 13/183 |
| | | | | 348/E13.071 |
| 2011/0224970 | A1 | 9/2011 | Bernal | |
| 2013/0122870 | A1* | 5/2013 | Hegde | H04M 3/5335 |
| | | | | 455/412.2 |
| 2013/0144595 | A1* | 6/2013 | Lord | G06F 40/58 |
| | | | | 704/2 |
| 2014/0177957 | A1* | 6/2014 | Clark | H04N 19/136 |
| | | | | 382/232 |
| 2014/0180686 | A1* | 6/2014 | Schuck | G10L 15/26 |
| | | | | 704/235 |
| 2014/0242955 | A1* | 8/2014 | Kang | G06F 40/58 |
| | | | | 455/414.1 |
| 2015/0063451 | A1* | 3/2015 | Zhu | H04L 65/70 |
| | | | | 375/240.09 |
| 2015/0227510 | A1* | 8/2015 | Shin | G10L 15/04 |
| | | | | 704/2 |
| 2016/0140952 | A1* | 5/2016 | Graham | G10L 13/033 |
| | | | | 704/260 |
| 2017/0323203 | A1* | 11/2017 | Matusov | G06F 16/1794 |
| 2018/0039623 | A1* | 2/2018 | Ahn | G10L 15/26 |
| 2018/0052831 | A1* | 2/2018 | Ahn | G06F 40/51 |
| 2018/0075508 | A1* | 3/2018 | Hewavitharana | G06N 20/00 |
| 2018/0218727 | A1* | 8/2018 | Cutler | G10L 13/047 |
| 2018/0268548 | A1* | 9/2018 | Lin | G06V 10/82 |
| 2019/0065466 | A1* | 2/2019 | Kataoka | G06F 40/30 |
| 2019/0130273 | A1* | 5/2019 | Keskar | G06F 40/47 |
| 2019/0166180 | A1* | 5/2019 | Zhao | H04L 65/70 |
| 2019/0228074 | A1* | 7/2019 | Morehead | G06F 40/42 |
| 2019/0311375 | A1* | 10/2019 | Sapoznik | G06F 40/216 |
| 2019/0327463 | A1* | 10/2019 | Zhao | H04N 19/103 |
| 2019/0362712 | A1* | 11/2019 | Karpukhin | G06F 40/30 |
| 2019/0377797 | A1* | 12/2019 | Liu | G06N 3/09 |
| 2020/0013388 | A1* | 1/2020 | Lee | G10L 15/22 |
| 2020/0042597 | A1* | 2/2020 | Wu | H04L 51/02 |
| 2020/0043481 | A1* | 2/2020 | Xiong | G06F 40/205 |
| 2020/0043495 | A1 | 2/2020 | Park et al. | |
| 2020/0082806 | A1* | 3/2020 | Kim | G10L 13/033 |
| 2020/0104313 | A1* | 4/2020 | Jayaraman | G06F 16/3329 |
| 2020/0135172 | A1* | 4/2020 | Chen | G10L 13/047 |
| 2020/0192921 | A1* | 6/2020 | Satterfield | G06F 16/3323 |
| 2020/0194000 | A1* | 6/2020 | Xian | G10L 15/30 |
| 2020/0226328 | A1* | 7/2020 | Tu | G06N 3/04 |
| 2020/0234693 | A1* | 7/2020 | Sung | G10L 15/22 |
| 2020/0251100 | A1* | 8/2020 | Tan | G06N 3/096 |
| 2020/0342164 | A1* | 10/2020 | Satterfield | G06F 40/216 |
| 2020/0342348 | A1* | 10/2020 | Kenny | G06N 20/00 |
| 2020/0342852 | A1 | 10/2020 | Kim et al. | |
| 2020/0357389 | A1* | 11/2020 | Bai | G10L 25/21 |
| 2020/0365134 | A1* | 11/2020 | Tu | G10L 15/04 |
| 2020/0387676 | A1* | 12/2020 | Kim | G10L 15/16 |
| 2020/0401716 | A1* | 12/2020 | Yan | G06F 21/6254 |
| 2021/0020165 | A1* | 1/2021 | Scodary | G06N 20/20 |
| 2021/0027471 | A1* | 1/2021 | Cohen | G06N 3/0442 |
| 2021/0027799 | A1* | 1/2021 | Scodary | G06Q 10/06395 |
| 2021/0029248 | A1* | 1/2021 | Scodary | G06F 18/21342 |
| 2021/0042475 | A1* | 2/2021 | Zhang | G06N 3/082 |

(56)  References Cited

U.S. PATENT DOCUMENTS

| | | | |
|---|---|---|---|
| 2021/0043196 A1* | 2/2021 | Lee | G10L 15/187 |
| 2021/0050033 A1* | 2/2021 | Bui | G06N 3/0442 |
| 2021/0065690 A1* | 3/2021 | Indurthi | G10L 15/183 |
| 2021/0112281 A1* | 4/2021 | Wang | H04L 65/70 |
| 2021/0117780 A1* | 4/2021 | Malik | G06V 40/16 |
| 2021/0134274 A1* | 5/2021 | Lee | G10L 15/30 |
| 2021/0142127 A1* | 5/2021 | Lee | G06F 18/217 |
| 2021/0150214 A1* | 5/2021 | Xu | H04N 23/62 |
| 2021/0158815 A1* | 5/2021 | Lee | G06F 40/289 |
| 2021/0165974 A1* | 6/2021 | Lee | G06F 40/47 |
| 2021/0174801 A1* | 6/2021 | Back | G06N 3/0464 |
| 2021/0182077 A1* | 6/2021 | Chen | G06F 9/445 |
| 2021/0203989 A1* | 7/2021 | Wang | H04N 19/13 |
| 2021/0210077 A1 | 7/2021 | Yuan et al. | |
| 2021/0272559 A1* | 9/2021 | Medalion | G06N 20/00 |
| 2021/0312938 A1 | 10/2021 | Yun et al. | |
| 2021/0314621 A1* | 10/2021 | Betts | H04N 19/174 |
| 2021/0365644 A1* | 11/2021 | Mei | G06N 3/0442 |
| 2021/0374338 A1* | 12/2021 | Shrivastava | G06F 40/30 |
| 2021/0375272 A1* | 12/2021 | Madwed | G06F 3/167 |
| 2021/0397636 A1* | 12/2021 | Margolin | G06F 16/35 |
| 2022/0005481 A1* | 1/2022 | Kim | G10L 17/02 |
| 2022/0019294 A1* | 1/2022 | Strom | G06F 3/0219 |
| 2022/0093088 A1* | 3/2022 | Rangarajan Sridhar | G06F 16/338 |
| 2022/0129645 A1* | 4/2022 | Kim | G06N 3/0455 |
| 2022/0172713 A1* | 6/2022 | Kwatra | G06F 40/232 |
| 2022/0199075 A1* | 6/2022 | Padmanabhan | G06N 20/00 |
| 2022/0208179 A1* | 6/2022 | Kurata | G06N 3/0442 |
| 2022/0245365 A1* | 8/2022 | Meng | G06F 40/44 |
| 2022/0254331 A1* | 8/2022 | Jafari | G06F 9/547 |
| 2022/0293107 A1* | 9/2022 | Leaman | G06Q 30/0271 |
| 2022/0327278 A1* | 10/2022 | Yin | G06F 40/30 |
| 2022/0343139 A1* | 10/2022 | Passban | G06N 3/08 |
| 2022/0343250 A1* | 10/2022 | Tremblay | G06F 3/0482 |
| 2022/0357929 A1* | 11/2022 | Vijayaraghavan | G06N 3/0442 |
| 2022/0382736 A1* | 12/2022 | Beilis | G06N 3/045 |
| 2022/0382998 A1* | 12/2022 | Tang | G10L 13/047 |
| 2022/0399006 A1* | 12/2022 | Jin | G06N 3/0442 |
| 2023/0009878 A1* | 1/2023 | Port | H04N 21/4532 |
| 2023/0031245 A1* | 2/2023 | Longhurst | H04N 19/17 |
| 2023/0040412 A1* | 2/2023 | Ramsl | G06F 8/73 |
| 2023/0047378 A1* | 2/2023 | Lin | G10L 15/005 |
| 2023/0079147 A1* | 3/2023 | Hewavitharana | G06Q 30/0623 704/4 |
| 2023/0089902 A1* | 3/2023 | Arkhangorodsky | G06F 40/58 704/277 |
| 2023/0109407 A1* | 4/2023 | Hu | G10L 15/02 704/232 |
| 2023/0226689 A1* | 7/2023 | Chu | B25J 19/023 700/257 |
| 2023/0262283 A1* | 8/2023 | Takayama | H04N 21/4325 |
| 2023/0274101 A1* | 8/2023 | Kim | G10L 15/26 704/2 |
| 2023/0281401 A1* | 9/2023 | Kakemura | G10L 15/26 704/3 |
| 2023/0344937 A1* | 10/2023 | Scodary | G06F 40/30 |
| 2023/0368796 A1* | 11/2023 | Liu | G10L 15/26 |
| 2023/0418793 A1* | 12/2023 | Urdiales | G06F 16/215 |
| 2024/0013010 A1* | 1/2024 | Mannami | H04W 72/04 |
| 2024/0021193 A1* | 1/2024 | Alomari | G10L 15/16 |
| 2024/0096236 A1* | 3/2024 | Moss | G10L 15/18 |
| 2024/0235577 A1* | 7/2024 | Zhang | H03M 7/3079 |
| 2024/0284285 A1* | 8/2024 | Lee | H04W 36/00 |
| 2024/0370669 A1* | 11/2024 | Akiyama | G06F 40/40 |
| 2025/0006207 A1* | 1/2025 | Sharifi | G06N 3/045 |
| 2025/0008184 A1* | 1/2025 | Liu | G11B 27/031 |

FOREIGN PATENT DOCUMENTS

| | | |
|---|---|---|
| JP | 2019008744 A | 1/2019 |
| KR | 1020150021707 A | 3/2015 |
| KR | 1020180005850 A | 1/2018 |
| KR | 1020180060903 A | 6/2018 |
| KR | 1020190114938 A | 10/2019 |
| KR | 1020200091797 A | 7/2020 |
| KR | 102170902 B1 | 10/2020 |
| KR | 10-2021-0019920 A | 2/2021 |
| KR | 10-2021-0124050 A | 10/2021 |

OTHER PUBLICATIONS

International Search Report (ISA/210) issued Dec. 13, 2022 by the International Searching Authority in International Application No. PCT/KR2022/012876.
Written Opinion (ISA/237) issued Dec. 13, 2022 by the International Searching Authority in International Application No. PCT/KR2022/012876.
Examination Report issued on Feb. 17, 2026 by the Indian Patent Office for Indian Patent Application No. 202447034843.

* cited by examiner

DEVICE 1

100

ELECTRONIC DEVICE AND CONTROL METHOD THEREOF

CROSS-REFERENCE TO RELATED APPLICATION(S)

This application is a bypass continuation of International Application No. PCT/KR2022/012876, filed on Aug. 29, 2022, which is based on and claims priority to Korean Patent Application No. 10-2021-0137491, filed on Oct. 15, 2021, and Korean Patent Application No. 10-2022-0046172, filed on Apr. 14, 2022, in the Korean Intellectual Property Office, the disclosures of which are incorporated by reference herein in their entireties.

BACKGROUND

1. Field

The disclosure relates to an electronic apparatus and a method for controlling thereof. More particularly, the disclosure relates to an electronic apparatus configured to receive a user voice and method for controlling thereof.

2. Description of Related Art

Recently, a translation function has been installed in a number of electronic apparatuses.

The translation function installed in the electronic apparatus can be basically performed using an encoder that encodes a user voice and a decoder that decodes the user voice into the other language to be translated (or interpreted).

In order to translate an external device performing communication, for example, a language of a person on the other end of the line into a language of a user of the electronic apparatus, the electronic apparatus must include an encoder and a decoder corresponding to the language of the person on the other end of the line.

Accordingly, in order to translate all of various languages into the user's language, since encoders and decoders corresponding to all of the various languages must be provided, there is a limit on resources of the electronic apparatus to provide a translation function in a form of an on device. There is a problem that smooth translation is possible only when a product specification of the apparatus is high.

When the electronic apparatus receives text in a language to be translated (e.g., target language) after transmitting the user voice to an external server, it is not necessary to have encoders and decoders corresponding to all of the various languages, but there are security-related issues, such as a risk of hacking, personal information or privacy exposure.

Thus, there is a need for an electronic apparatus and method that provides a smooth translation function on-device without having an encoder and a decoder corresponding to all of the various languages.

SUMMARY

The disclosure has been made in accordance with the needs described above, and an object of the disclosure is to provide an electronic apparatus in which an electronic apparatus provides a translation function by transmitting and receiving a feature vector to and from an external device, and a method for controlling thereof.

According to an aspect of the disclosure, an electronic apparatus includes: a microphone; a communication interface including communication circuitry; a memory configured to store a first encoder corresponding to a first language and a first decoder corresponding to the first language; and a processor configured to: based on a user voice in the first language being received through the microphone, acquire text in the first language corresponding to the user voice, acquire a first feature vector by inputting the text in the first language to the first encoder, control the communication interface to transmit the first feature vector to an external device, and based on a second feature vector being received from the external device through the communication interface, acquire text in the first language corresponding to the second feature vector by inputting the second feature vector to the first decoder.

The first encoder may include a model learned based on the first text in the first language as input data and a feature vector on a vector space as output data, and a second encoder corresponding to a second language different from the first language may include a model learned based on a second text in the second language having a similarity greater than or equal to a threshold value with the first text as input data and a feature vector in a vector space as output data.

The external device may include the second encoder corresponding to the second language, and the second encoder may be configured to output the second feature vector based on text corresponding to the user voice in the second language being input.

The first decoder may include a model learned based on a feature vector on a vector space as input data and the first text in the first language as output data, and a second decoder corresponding to a second language different from the first language may include a model learned based on a feature vector in a vector space as input data and a second text in the second language having a similarity greater than or equal to a threshold value with the first text as output data.

The external device may include the second decoder corresponding to the second language, and the second decoder may be configured to output text in the second language based on the first feature vector received from the electronic apparatus being input.

The processor may be further configured to: identify whether the external device may include the second decoder corresponding to the second language by communicating with the external device via the communication interface; based on identifying that the external device may include the second decoder, control the communication interface to transmit the first feature vector to the external device, and based on identifying that the external device does not include the second decoder, control the communication interface to transmit the first feature vector to a server.

The electronic apparatus may further include a speaker, and the processor may be further configured to: acquire a sound of the first language corresponding to the text in the first language using text to speech; and output the sound of the first language through the speaker.

The memory further may include a compressor and a decompressor, and the processor may be further configured to: compress the first feature vector based on the compressor; control the communication interface to transmit the compressed first feature vector to the external device; decompress the compressed second feature vector based on the decompressor based on a compressed second feature vector being received from the external device; and input the decompressed second feature vector to the first decoder.

The first encoder and the first decoder may be included in a neural machine translation model, and the neural machine translation model may be configured to: based on the user voice being input, acquire the first feature vector by converting the text corresponding to the user voice into a vector value; and based on the second feature vector being input, convert the second feature vector into text in the first language.

According to an aspect of the disclosure, a method for controlling an electronic apparatus, includes: based on a user voice in a first language being received, acquiring text in the first language corresponding to the user voice; acquiring a first feature vector by inputting the text in the first language to a first encoder; transmitting the first feature vector to an external device; and based on a second feature vector being received from the external device, acquiring text in the first language corresponding to the second feature vector by inputting the second feature vector to a first decoder corresponding to the first language.

The first encoder may include a model learned based on the first text in the first language as input data and a feature vector on a vector space as output data, and a second encoder corresponding to a second language different from the first language may include a model learned based on a second text in the second language having a similarity greater than or equal to a threshold value with the first text as input data and a feature vector in a vector space as output data.

The external device may include the second encoder corresponding to the second language, and the second encoder may be configured output the second feature vector based on text corresponding to the user voice in the second language being input to the second encoder.

The first decoder may include a model learned based on a feature vector on a vector space as input data and the first text in the first language as output data, and a second decoder corresponding to the second language different from the first language may include a model learned based on a feature vector in a vector space as input data and the second text in the second language having a similarity greater than or equal to a threshold value with the first text as output data.

The external device may include the second decoder corresponding to the second language, and the second decoder may be configured to output text in the second language based on the first feature vector received from the electronic apparatus being input.

The method may further include: identifying whether the external device may include the second decoder corresponding to the second language by communicating with the external device; based on identifying that the external device may include the second decoder, transmitting the first feature vector to the external device; and based on identifying that the external device does not include the second decoder, transmitting the first feature vector to a server.

As described above, according to various embodiments of the disclosure, since each of a plurality of electronic apparatuses has encoding and decoding functions corresponding to the user's main language, a smooth translation function without excessive resource demand can be provided.

BRIEF DESCRIPTION OF THE DRAWINGS

The above and/or other aspects, features, and advantages of example embodiments of the disclosure will be more apparent from the following description taken in conjunction with the accompanying drawings, in which.

DETAILED DESCRIPTION

Hereinafter, embodiments of the disclosure will be described in detail with reference to the accompanying drawings.

Terms used in the disclosure are selected as general terminologies currently widely used in consideration of configurations and functions of the one or more embodiments of the disclosure, but can be different depending on intention of those skilled in the art, a precedent, appearance of new technologies, or the like. Further, in specific cases, terms may be arbitrarily selected. In that configuration, the meaning of the terms will be described in the description of the corresponding embodiments. Accordingly, the terms used in the description should not necessarily be construed as simple names of the terms, but be defined based on meanings of the terms and overall contents of the disclosure.

The terms "have", "may have", "include", and "may include" used in the exemplary embodiments of the disclosure indicate the presence of corresponding features (for example, elements such as numerical values, functions, operations, or parts), and do not preclude the presence of additional features.

The term "at least one of A or/and B" means including at least one A, including at least one B, or including both at least one A and at least one B.

The term such as "first" and "second" used in various exemplary embodiments may modify various elements regardless of an order and/or importance of the corresponding elements, and does not limit the corresponding elements.

When an element (e.g., a first element) is "operatively or communicatively coupled with/to" or "connected to" another element (e.g., a second element), an element may be directly coupled with another element or may be coupled through the other element (e.g., a third element).

Singular forms are intended to include plural forms unless the context clearly indicates otherwise. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

In the disclosure, a 'module' or a 'unit' performs at least one function or operation and may be implemented by hardware or software or a combination of the hardware and the software. In addition, a plurality of 'modules' or a plurality of 'units' may be integrated into at least one module and may be at least one processor except for 'modules' or 'units' that should be realized in a specific hardware.

Also, the term "user" may refer to a person who uses an electronic apparatus or an apparatus (e.g., an artificial intelligence (AI) electronic apparatus) that uses the electronic apparatus.

Hereinafter, various embodiments of the disclosure will be described in more detail with reference to the accompanying drawings.

Figure 1:
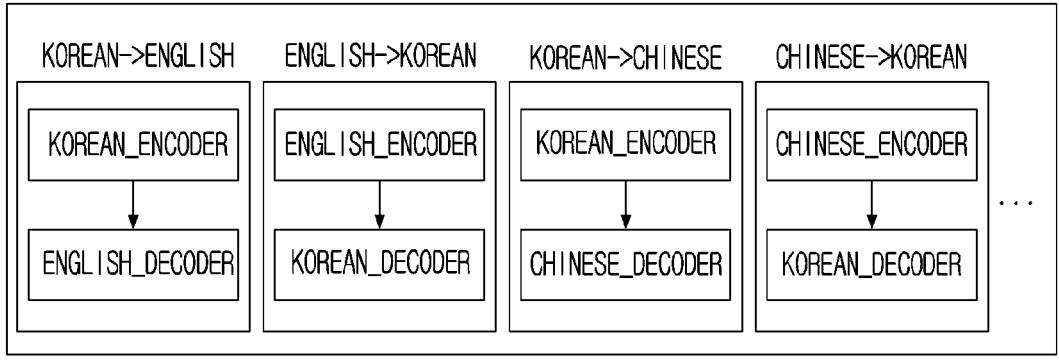
FIG. 1 is a view illustrating an encoder and a decoder provided in an electronic apparatus that provides a translation function according to the related art.

FIG. 1 is a view illustrating an encoder and a decoder provided in an electronic apparatus that provides a translation function according to the related art.

Referring to FIG. 1, a prior electronic apparatus includes an encoder of a first language and a decoder of a second language to translate (or convert) a first language into a second language.

For example, a related art electronic apparatus is equipped with a Korean encoder and an English decoder to translate a user voice or text in Korean (KR) into English (EN).

According to an embodiment, when a user voice in Korean is received, the prior electronic apparatus converts the user voice into Korean text. The Korean encoder transforms the Korean text into a feature vector. The English decoder converts the feature vector into English text, and the related art electronic apparatus may display or output the English text acquired through the English decoder as sound, and may transmit the English text to an external device communicating with the electronic apparatus.

As shown in FIG. 1, a related art electronic apparatus has a plurality of encoders and a plurality of decoders to provide a translation function for various languages. For example, a prior electronic apparatus has a Korean encoder and an English decoder to provide a translation function from Korean to English, and an English encoder and a Korean decoder to provide a translation function from English to Korean.

In addition, as shown in FIG. 1, an encoder and a decoder corresponding to various languages must be provided in order to provide a translation function for various languages, such as a translation function from Korean to Chinese and a translation function from Chinese to Korean. Thus, there is a problem in that the electronic apparatus should have a very large resource for driving a plurality of encoders and decoders and high product specifications.

Particularly, when it is difficult to smoothly drive a plurality of encoders and decoders due to resource limitations or it is difficult to provide a translation function in real time, the related art electronic apparatus transmits text in a first language to a server and provide a translation function by receiving text translated in a second language from the server. In that configuration, since an on-device translation function that performs translation on the electronic apparatus itself without going through a network or server cannot be provided, there is a risk that the user voice or text may be exposed to hacking, and issues related thereto.

Hereinafter, an electronic apparatus, a system, and a control method capable of providing an on-device translation function without limitations according to resources or product specifications, unlike in the related art, will be described according to various embodiments of the disclosure.

Figure 2:
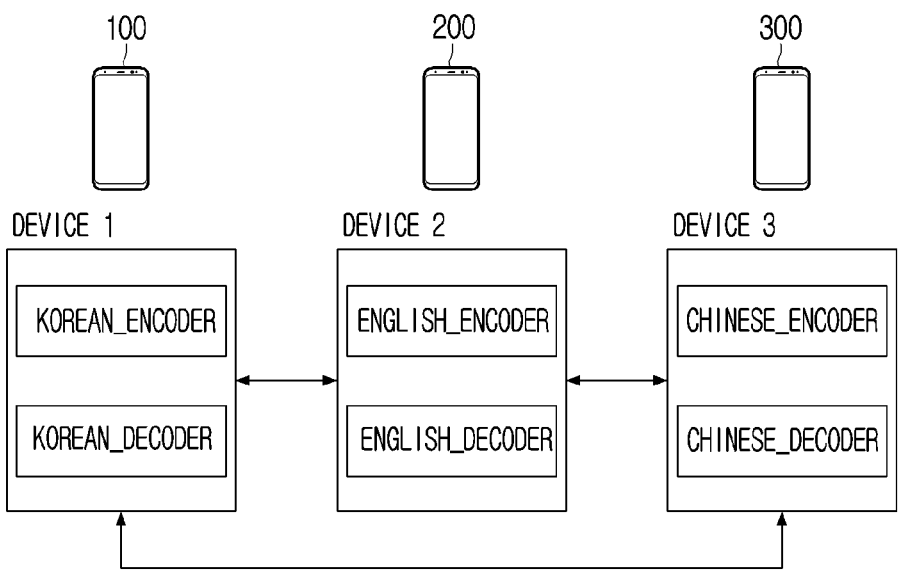
FIG. 2 is a view illustrating an encoder and a decoder provided in an electronic apparatus according to an embodiment.

FIG. 2 is a view illustrating an encoder and a decoder provided in an electronic apparatus according to an embodiment.

Referring to FIG. 2, the electronic apparatus 100 may communicate with various external devices.

For example, the user of the electronic apparatus 100 may use Korean as a main language, a user of a second external device 200 may use English as a main language, and a user of a third external device 300 may use Chinese as a main language.

According to a method in the related art, the electronic apparatus 100 translates the user voice in Korean into the main language used by each user of a first external device 200 and the second external device 300, and is equipped with a Korean encoder, an English decoder, and a Chinese decoder to provide translation to the first external device 200 and the second external device 300, respectively.

According to an embodiment of the disclosure, the electronic apparatus 100 may include a first encoder and a first decoder corresponding to the main language (hereinafter, referred to as the first language) of the user of the electronic apparatus 100.

The first external device 200 communicating with the electronic apparatus 100 may include a second encoder and a second decoder corresponding to the user's main language (hereinafter, referred to as a second language) of the first external device 200.

The second external device 300 may include a third encoder and a third decoder corresponding to the main language of the user of the second external device 200, that is, a third language.

Referring to FIG. 2, the electronic apparatus 100 may include only a first encoder and a first decoder corresponding to a first language.

According to an embodiment, when the user voice in the first language is received, the electronic apparatus 100 may convert the user voice into text and input the text into the first encoder. The first encoder may acquire a first feature vector corresponding to the text.

The electronic apparatus 100 may transmit the first feature vector to the first external device 200 communicating with the electronic apparatus 100.

The first external device 200 may acquire text in the second language corresponding to the first feature vector by inputting the first feature vector received from the electronic apparatus to the second decoder.

Through the process described above, even when the electronic apparatus 100 does not include the second decoder corresponding to the second language, the electronic apparatus 100 may transmit the first feature vector and the first external device 200 may convert the first feature vector received from the electronic apparatus 1000 into text in the second language, and as a result, communication may be possible between the user of the electronic apparatus 100 and the user of the first external device 200 by converting the user voice in the first language into text in the corresponding second language.

As another example, the first external device 200 may acquire a second feature vector by inputting a user voice (or text corresponding to the user voice) of the second language to the second encoder. The first external device 200 may transmit the second feature vector to the electronic apparatus 100, and the electronic apparatus 100 may acquire the text in the first language by inputting the second feature vector to the first decoder.

According to an embodiment, each of the electronic apparatus 100, the first external device 200, and the second external device 300 may convert the user voice into a feature vector using an encoder provided therein, and transmit the converted feature vector. In addition, each of the electronic apparatus 100 and the first external device 200 (or the second external device 300) may receive the feature vector and convert the feature vector into text using a decoder provided therein.

Figure 3:
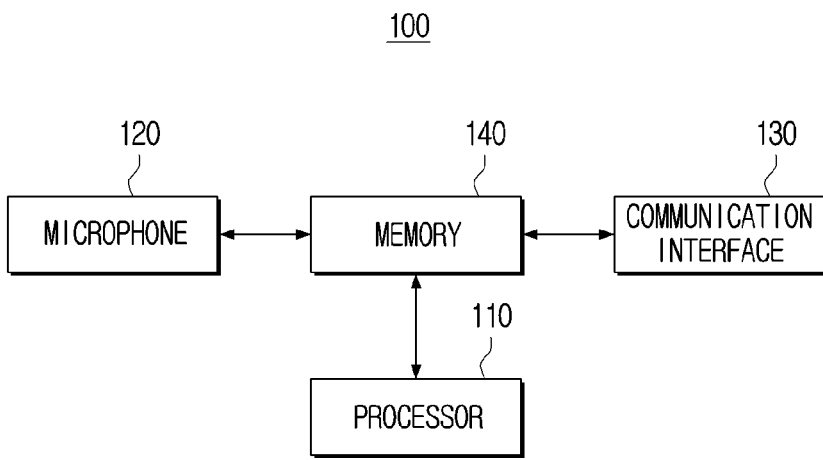
FIG. 3 is a block diagram illustrating a configuration of an electronic apparatus according to an embodiment.

FIG. 3 is a block diagram illustrating a configuration of an electronic apparatus according to an embodiment.

Referring to FIG. 3, the electronic apparatus 100 includes a microphone 110, a memory 120, a communication interface 130, and a processor 140.

The microphone 110 may receive a user voice. The microphone 110 is an example of an input interface, but embodiments are not limited thereto, and the electronic apparatus 100 may receive a user input through a keyboard, a mouse, a key pad, a touch pad, or the like.

The memory 120 may store data required for various embodiments of the disclosure. The memory 120 may be implemented in the form of a memory embedded in the electronic apparatus 100 or may be implemented in the form of a memory detachable to the electronic apparatus 100 depending on a purpose of data storage.

For example, data for driving the electronic apparatus 100 may be stored in a memory embedded in the electronic apparatus 100, and data for an extended function of the electronic apparatus 100 may be stored in a memory attached to and detached from the electronic apparatus 100. The memory embedded in the electronic apparatus 100' may be implemented as at least one of a volatile memory (e.g., dynamic RAM (DRAM), static RAM (SRAM), or synchronous dynamic RAM (SDRAM)), non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (e.g., NAND flash or NOR flash, etc.), a hard drive, or a solid state drive (SSD). In addition, the memory detachable from the electronic apparatus 100 may be implemented as a memory card (e.g., compact flash (CF), secure digital (SD), micro secure digital (Micro-SD), mini secure digital (Mini-SD), extreme digital (xD), multi-media card (MMC), etc.), external memory that can be connected to the USB port (e.g., USB memory), or the like.

According to an example, the memory 120 may store at least one instruction for controlling the electronic apparatus 100 or a computer program including the instructions.

For example, the memory 120 may store information about an artificial intelligence model including a plurality of layers. In this configuration, storing information about the artificial intelligence model may refer to storing various information related to the operation of the artificial intelligence model, for example, information on a plurality of layers included in the artificial intelligence model, information on parameters used in each of the plurality of layers (for example, filter coefficients, bias, etc.).

For example, according to an embodiment of the disclosure, the memory 120 may store a neural machine translation (NMT) model including a first encoder learned to convert text in a first language into a feature vector, and a first decoder learned to convert the feature vector into text in the first language. A detailed description of the NMT model will be described below.

The communication interface 130 according to an embodiment of the disclosure may receive various data. For example, the communication interface 130 may receive various data from an external device (e.g., user terminal device such as first external device 100, second external device 200, etc.), an external storage medium (e.g., USB memory), an external server (e.g., a server providing translation function) through a communication method such as an AP-based Wi-Fi (Wireless LAN network), Bluetooth, Zigbee, wired/wireless Local Area Network (LAN), Wide Area Network (WAN), Ethernet, IEEE 1394, High-Definition Multimedia Interface (HDMI), Universal Serial Bus (USB), Mobile High-Definition Link (MEL), Audio Engineering Society/European Broadcasting Union (AES/EBU), Optical, Coaxial, or the like.

For example, the communication interface 130 may transmit a feature vector to an external device or receive a feature vector from the external device under a control of the processor 140. A detailed description thereof will be described below.

The processor 130 according to an embodiment may control the overall operation of the electronic apparatus 100.

According to an embodiment, the processor 140 may be implemented as a digital signal processor (DSP), a microprocessor, an artificial intelligence (AI), a timing controller (T-CON) that processes a digital image signal. However, it is not limited thereto, and may include one or more of a central processing unit (CPU), microcontroller unit (MCU), micro processing unit (MPU), controller, application processor (AP), or communication processor (CP), ARM processor, or may be defined with a corresponding term. In addition, the processor 140 may be implemented as a system on chip (SoC), large scale integration (LSI), or a field programmable gate array (FPGA) having a built-in processing algorithm.

For example, the processor 140 may acquire a feature vector corresponding to the text by recognizing the user voice and inputting a text corresponding to the user voice or a text according to the user's input to the first encoder. For example, an automatic speech recognition (ASR) module included in the processor 140 may acquire a text in a first language corresponding to the user voice by recognizing a user voice received through the microphone 110.

In addition, the processor 140 may acquire the text in the first language corresponding to the feature vector by inputting the feature vector received from an external device through the communication interface 130 to the first decoder.

The memory 120 may store a neural network model operating as a first encoder and a neural network model operating as a first decoder, i.e., at least two neural network models.

As another example, the memory 120 may include a first encoder and a first decoder, and store a neural network model learned to convert it to the feature vector when a text in a first language is inputted, and convert it to text in the first language when the feature vector is inputted.

The first encoder corresponding to the first language may be a model learned by using the first text in the first language as input data and a feature vector in a vector space as output data.

According to an embodiment, the second encoder corresponding to a second language different from the first language may be a model learned using a second text in a second language having a similarity greater than or equal to a threshold value with the first text as input data and a feature vector in a vector space as output data.

When a meaning of the first text, which is the input data of the first encoder, and the second text, which is the input data of the second encoder, have a similarity greater than or equal to a threshold value, a feature vector that is output data of the first encoder and a feature vector that is output data of the second encoder may be identical or similar.

The similarity is a numerical value of whether the meaning is similar between the first text in the first language and the second text in the second language, and may be expressed as a value of 0 to 1. As the similarity is closer to 1, it may indicate that the meaning of the first text in the first language and the meaning of the second text in the second language are identical or similar. The first threshold value may be 0.9, which is only an example and is not limited thereto.

The first decoder corresponding to the first language may be a model learned by using a feature vector in a vector space as input data and using a first text in the first language as output data.

According to an embodiment, the second decoder corresponding to a second language different from the first language may be a model learned by using a feature vector in a vector space as input data and using a second text in the second language as output data.

When the feature vector that is the input data of the first decoder and the feature vector that is the input data of the second decoder are the same, the meaning of the first text in the first language that is the output data of the first decoder and the second text in the second language that is the output data of the second decoder may have a similarity greater than or equal to a threshold value.

The neural network model stored in the memory 120 may be a model based on a statistical machine translation (SMT) model or a model based on a neural machine translation (NMT). The neural network machine translation model (NMT) has an effect of outputting a natural and highly-quality translation by performing translation in units of whole sentences and phrases, rather than translating words individually. A detailed description thereof will be described with reference to FIG. 8.

Figure 4:
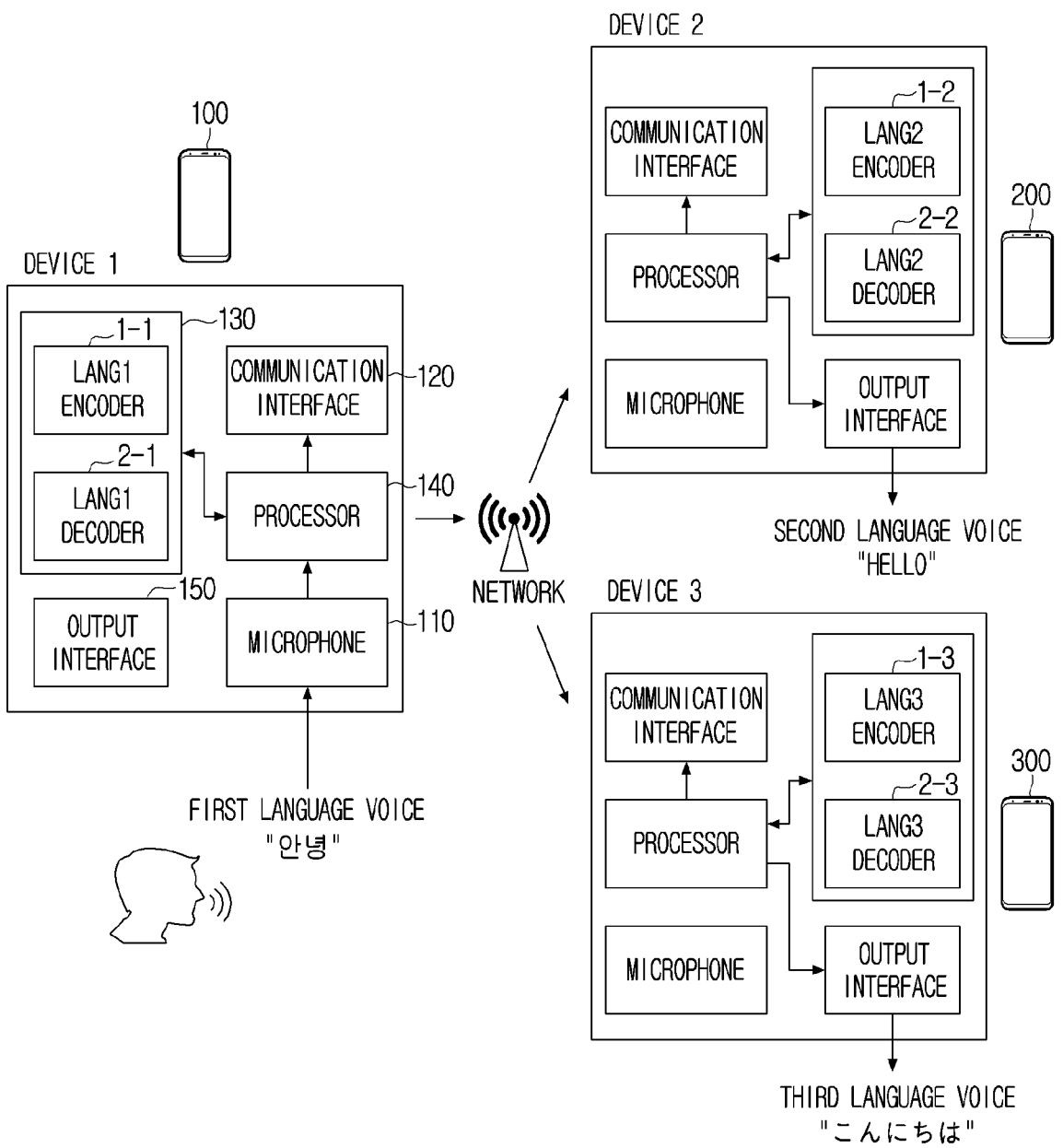
FIG. 4 is a view illustrating communication between an electronic apparatus and an external device according to an embodiment.

FIG. 4 is a view illustrating communication between an electronic apparatus and an external device according to an embodiment.

Referring to FIG. 4, when a user voice (e.g., 안 녕) of a first language is received through the microphone 110, the processor 140 may acquire a first feature vector by inputting the voice to a first encoder 1-1 corresponding to the first language.

The processor 140 may transmit the first feature vector to a first external device 200, a second external device 300, or the like using the communication interface 130.

The first external device 200 may acquire a second text (e.g., Hello) of the second language by inputting the received first feature vector to a second decoder 2-2 corresponding to the second language.

As another example, when a user voice (e.g., Hello) of the second language is received, the first external device 200 may acquire a second feature vector by inputting the voice to a second encoder 1-2 corresponding to the second language.

The first external device 200 may transmit the second feature vector to the electronic apparatus 100, the second external device 300, or the like.

The processor 140 included in the electronic apparatus 100 may acquire the first text (e.g., 안 녕) of the first language by imputing the second feature vector to a first decoder 2-1 corresponding to the first language. The processor 140 may acquire a sound of the first language corresponding to the first text in the first language using a text to speech (TTS) model, and output the sound of the first language through an output interface 150. The output interface 150 may be implemented as, for example, a speaker, a display, or the like.

Figure 5:
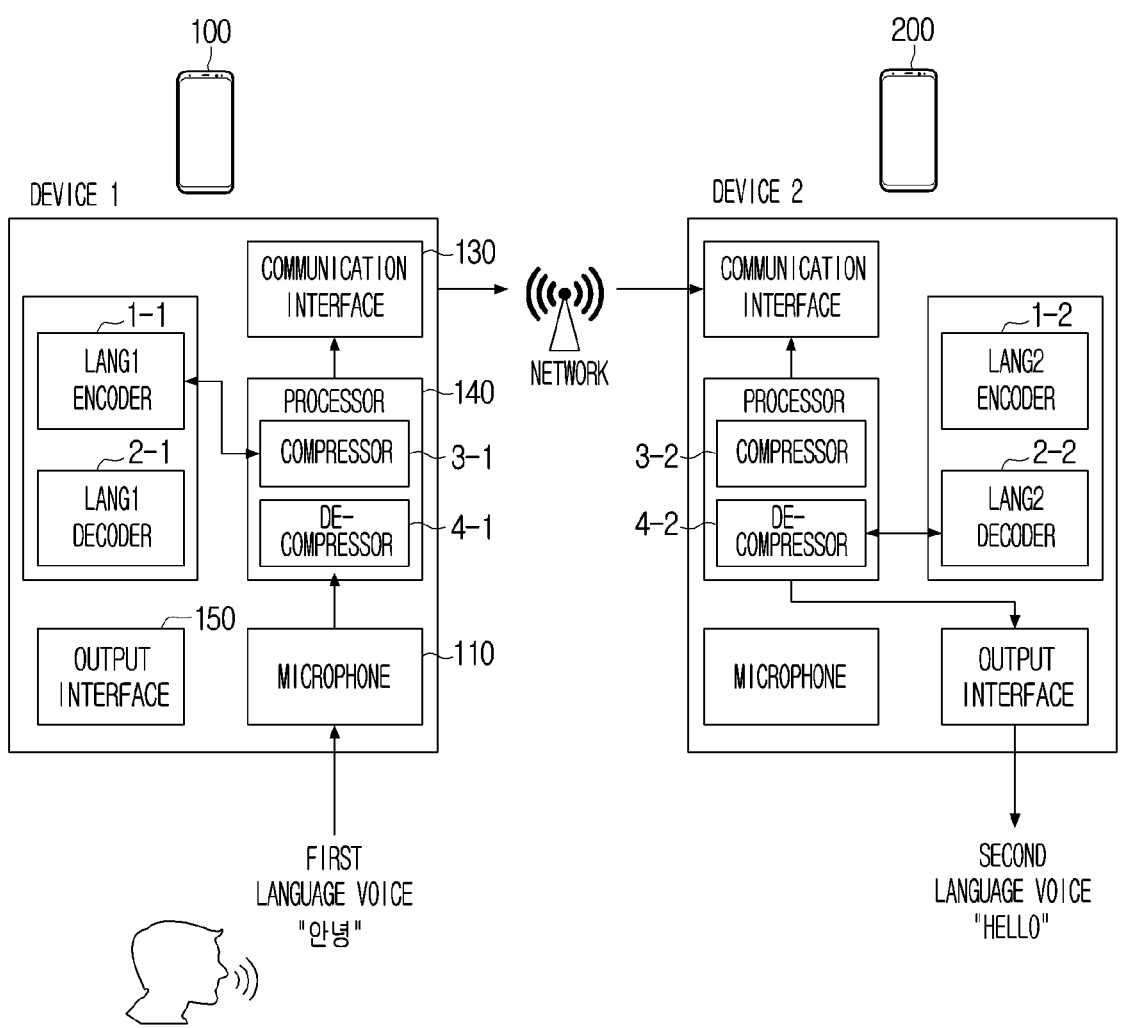
FIG. 5 is a view illustrating a compression process according to an embodiment.

FIG. 5 is a view illustrating a compression process according to an embodiment.

FIG. 5 is a view illustrating a method of compressing and transmitting a feature vector in order to increase communication efficiency between the electronic apparatus 100 and an external device.

As described above, when a user voice (e.g., 안 녕) of a first language is received through the microphone 110, the processor 140 may acquire a first feature vector by inputting the voice to a first encoder 1-1 corresponding to the first language.

The memory 120 may store various compression algorithms (hereinafter, compressors) for compressing the feature vectors. The processor 140 may compress the first feature vector using the compressor, and transmit the compressed first feature vector to the first external device 200, the second external device 300, etc. using the communication interface 130.

The first external device 200 may decompress the compressed first feature vector using various decompression algorithms (hereinafter, decompressor). The first external device 200 may acquire a second text (e.g., Hello) of the second language by inputting the first feature vector to a second decoder 2-2 corresponding to the second language.

As another example, when a user voice (e.g., Hello) of the second language is received, the first external device 200 may acquire a second feature vector by inputting the voice to a second encoder 1-2 corresponding to the second language, and transmit, to the electronic apparatus 100, the second feature vector by compressing the vector.

The processor 140 included in the electronic apparatus 100 may decompress the compressed second feature vector using a decompressor stored in the memory 120. The processor 140 may acquire the first text (e.g., hello) of the first language by inputting the second feature vector to the first decoder 2-1 corresponding to the first language.

The compressor and decompressor provided in each of the electronic apparatus 100 and the external device may use a related algorithm for compressing (or decompressing) a vector that is a component of a spatial domain. The vector compression algorithm may include at least one of a lossy or lossless compression algorithm.

For example, the processor 140 may identify a communication state between the electronic apparatus 100 and an external device, and when a bandwidth, speed, etc. according to the communication state is less than a reference value, the processor 140 may compress the feature vector at a relatively high compression rate by using a lossy compression algorithm.

As another example, the processor 140 may identify a communication state between the electronic apparatus 100 and an external device, and when the bandwidth, speed, etc. according to the communication state is greater than or equal to the reference value, the processor 140 may compress the feature vector at a relatively low compression rate by using a lossless compression algorithm. As another example, the processor 140 may transmit an uncompressed feature vector to an external device.

Figure 6:
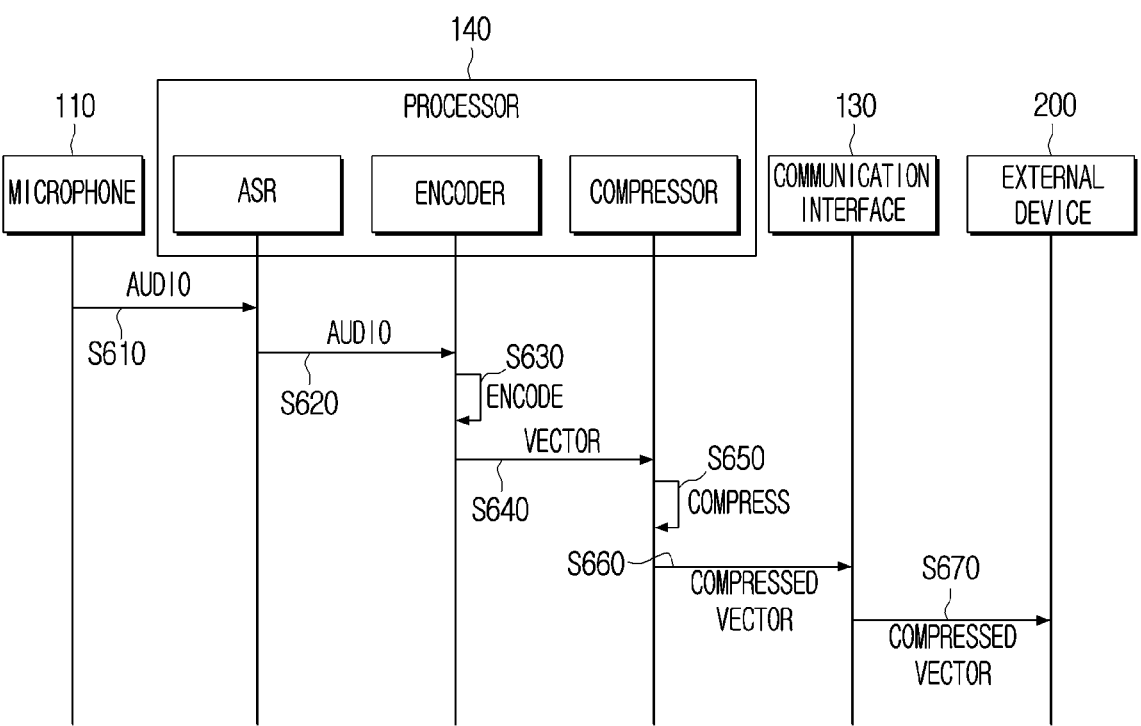
FIG. 6 is a sequence diagram illustrating a process of transmitting a feature vector according to an embodiment.

FIG. 6 is a sequence diagram illustrating a process of transmitting a feature vector according to an embodiment.

Referring to FIG. 6, the user voice in the first language received through the microphone 110 may be transmitted to the processor 140 (S610). The processor 140 may acquire a first text corresponding to the user voice by using an ASR module (S620).

The processor 140 may acquire a first feature vector corresponding to the first text by using the encoder 1-1 corresponding to the first language (S630).

The processor 140 may transmit the first feature vector to a compressor module (S640). The processor 140 may compress the first feature vector using the compressor module (S650), and transmit the compressed first feature vector to the communication interface 130 (S660).

The processor 140 may transmit the compressed first feature vector to the first external device 200 through the communication interface 130 (S670).

Figure 7:
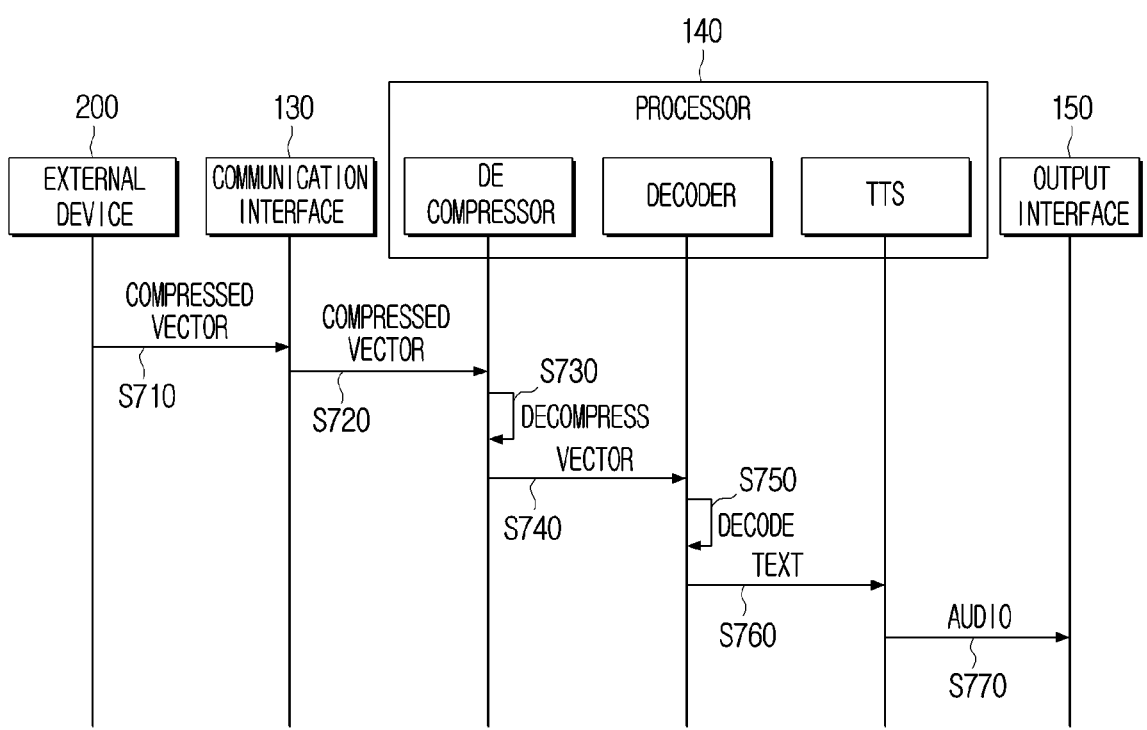
FIG. 7 is a sequence diagram illustrating a process of receiving a feature vector according to an embodiment.

FIG. 7 is a sequence diagram illustrating a process of receiving a feature vector according to an embodiment.

Referring to FIG. 7, a compressed second feature vector may be received from the first external device 200 through the communication interface 130 (S710). When the compressed second feature vector is received from the communication interface 130 (S720), the processor 140 may decompress the compressed second feature vector using a decompressor module (S730).

The processor 140 may acquire the second text corresponding to the first language by inputting the second feature vector to the first decoder 2-1 corresponding to the first language (S750). The processor 140 may acquire a sound corresponding to the second text by inputting the second text corresponding to the first language into a TTS model, and may transmit the sound to the output interface 150 (760). The electronic apparatus 100 may output sound using the output interface 150.

Figure 8:
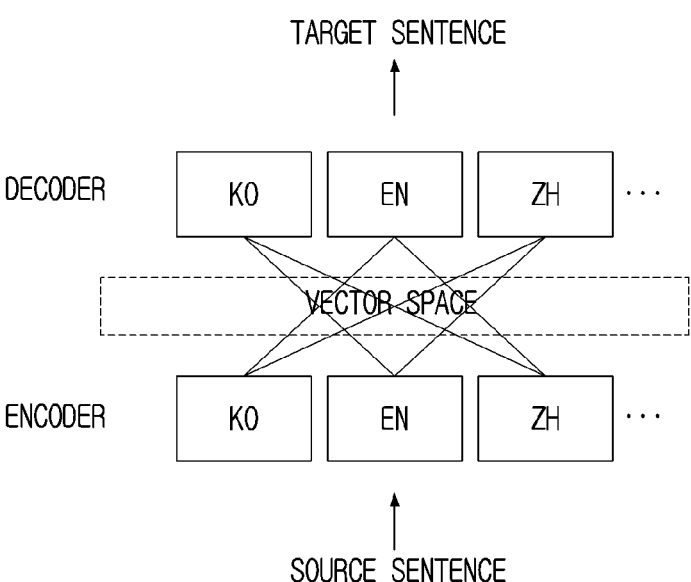
FIG. 8 is a view illustrating a learning process of an encoder and a decoder according to an embodiment.

FIG. 8 is a view illustrating a learning process of an encoder and a decoder according to an embodiment.

An encoder corresponding to each of a plurality of languages and a decoder corresponding to each of the plurality of languages are provided.

The first encoder corresponding to the first language among the plurality of languages may use the first text in the first language as input data (source sentence), and the second encoder corresponding to the second language among the plurality of languages may use the second text in the second language as input data (source sentence).

The first text in the first language and the second text in the second language may have different languages but may have the same meaning (or may have a similarity greater than or equal to a threshold value).

Each of the first encoder and the second encoder may be a sequence-to-sequence model. A sequence may refer to continuous data related to each other, and a sequence may refer to a sentence or phrase unit, not an individual word in the disclosure. For example, the first text in the first language, the second text in the second language, etc. may be continuous data, that is, a sentence.

With respect to the method of acquiring source sentence with similar meanings in the plurality of languages, for example, the processor 140 may acquire text corresponding to each of the plurality of languages by using a language model (LM). The language model may be an artificial intelligence model learned to output a sentence of a second language having a similarity greater than or equal to a threshold value when a sentence of a first language is input.

The language model may be a sequence-to-sequence model, and may include an encoder for processing input data and a decoder for processing output data. Each of the encoder and the decoder may include a plurality of recurrent neural network (RNN) cells. For example, the plurality of RNN cells may be configured with a long short-term memory (LSTM) or a gated recurrent unit (GRU).

The language model according to an embodiment is a neural network machine translation (NMT) model, and when the first text in the first language is received, the processor 140 may acquire the second text in the second language by inputting the first text into the NMT model.

The neural network machine translation model may be a model learned based on a parallel corpus. The parallel corpus may be a corpus configured in parallel such that sentences of different languages correspond to each other. The neural network machine translation model may be learned based on a plurality of sentences included in the parallel corpus for translating the first text in the first language into the second text in the second language.

With respect to the learning method of encoder, the processor 140 may input the first text in the first language and the second text in the second language acquired using the neural network machine translation model to the first encoder and the second encoder, respectively.

Since the first text and the second text have different languages but the same meaning, the first encoder and the second encoder may be learned such that the feature vector output by the first encoder by converting the first text and the feature vector output by the second encoder by converting the second text are the same.

The feature vector may be referred to as a context vector. After sequentially receiving input data, that is, a plurality of words constituting a sentence, the encoder may express a sentence including the plurality of words as a single context vector. The context vector may have various dimensions and sizes. Hereinafter, they are collectively referred to as a feature vector for convenience of description.

With respect to the learning method of decoder, according to an embodiment, the processor 140 may input the feature vector acquired using the first encoder to the second decoder, and may input the feature vector acquired using the second decoder to the first decoder.

Since the feature vectors input to each of the first decoder and the second decoder are the same, the first decoder and the second decoder may be learned such that the first text in the first language output by the first decoder and the second text in the second language output by the second decoder have different languages, but the same meaning.

With respect to the method of operating encoder and decoder, according to an embodiment, the encoder may divide the text into word units through tokenization, and convert each divided word into a feature vector through word embedding. The decoder may input each word converted into a feature vector at each time-step for each RNN cell included in the language model, and convert the output vector into a probability value for each word of an output sequence through a softmax function when an output vector is acquired from the RNN cell of each time-step, and the decoder may determine an output word, that is, a text.

Figure 9:
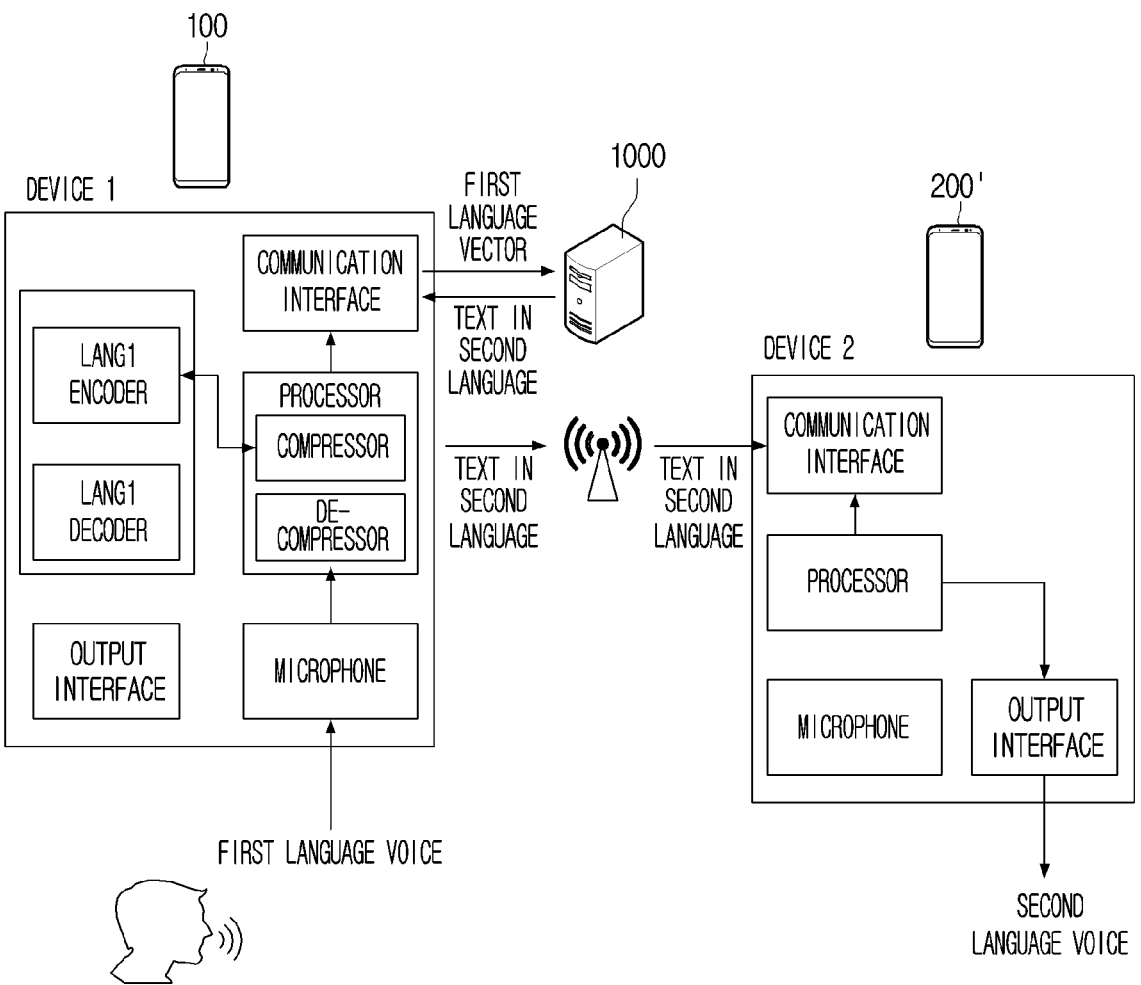
FIG. 9 is a view illustrating an electronic apparatus that communicates with a server according to an embodiment.

FIG. 9 is a view illustrating an electronic apparatus that communicates with a server according to an embodiment.

In the embodiments described above, the electronic apparatus 100 may include a first encoder and a first decoder corresponding to a first language, and the first external device 200 includes a second encoder and a second decoder corresponding to a second language. Therefore, even when the electronic apparatus 100 and the first external device 200 transmit or receive a feature vector, a translation function from the first language to the second language or the translation function from the second language to the first language may be more smoothly provided.

However, when the first external device 200 with which the electronic apparatus 100 communicates does not include the second encoder and the second decoder corresponding to the second language, even when the electronic apparatus 100 converts the text in the first language into a feature vector and then transmits the feature vector to the first external device 200, the first external device 200 may not acquire the text in the second language since there is no second decoder for converting the feature vector into text in the second language.

According to another embodiment of the disclosure, the electronic apparatus 100 may identify whether the first external device 200 includes the second decoder corresponding to the second language by performing communication with the first external device 200.

When it is identified that the first external device 200 includes the second decoder, the processor 140 may transmit the feature vector to the first external device 200.

As another example, when it is identified that the first external device 200 does not include the second decoder, the processor 140 may transmit the feature vector to a server 1000.

When text in the second language is received from the server 1000 according to transmission, the processor 140 may transmit the received text in the second language to the first external device 200.

Accordingly, even when the first external device 200 does not include an encoder and a decoder corresponding to the user's main language like the electronic apparatus 100, communication between the user of the electronic apparatus 100 and a user of the first external device 200 may be possible.

Referring back to FIG. 3, an electronic apparatus according to various embodiments may include at least one of, for example, smartphone, tablet personal computer (PC), mobile phone, video phone, e-book reader, desktop PC, laptop PC, netbook computer, workstation, server, personal digital assistant (PDA), portable multimedia player (PMP), MP3 player, medical device, camera, or a wearable device. A wearable device may include at least one of an accessory type (e.g.: watch, ring, bracelet, ankle bracelet, necklace, glasses, contact lens, or head-mounted-device (HMD)), fabric or cloth-embedded type (e.g.: e-cloth), body-attached type (e.g.: skin pad or tattoo), or bioimplant circuit.

In some embodiments, an electronic apparatus may include, for example, at least one of television, digital video disk (DVD) player, audio, refrigerator, air-conditioner, cleaner, oven, microwave, washing machine, air cleaner, set top box, home automation control panel, security control panel, media box (ex: Samsung HomeSync™, Apple TV™, or Google TV™), game console (ex: Xbox™ PlayStation™), e-dictionary, e-key, camcorder, or e-frame.

In another embodiment, an electronic apparatus may include various medical devices (ex: various portable medical measuring devices (blood glucose monitor, heart rate monitor, blood pressure measuring device, or body temperature measuring device, etc.), magnetic resonance angiography (MRA), magnetic resonance imaging (MRI), computed tomography (CT), photographing device, or ultrasonic device, etc.), navigator, global navigation satellite system (GNSS), event data recorder (EDR), flight data recorder (FDR), vehicle info-tainment device, e-device for ships (ex: navigation device for ship, gyrocompass, etc.), avionics, security device, head unit for vehicles, industrial or home-use robots, drone, ATM of financial institutions, point of sales (POS) of shops, or internet of things device (ex: bulb, sensors, sprinkler, fire alarm, temperature controller, streetlight, toaster, sporting goods, hot water tank, heater, boiler, etc.).

In the present disclosure, learning the artificial intelligence model may mean that a basic artificial intelligence model (for example, an artificial intelligence model including an arbitrary random parameter) is learned using a plurality of training data by a learning algorithm, and thus a predefined action rule or artificial intelligence model set to perform a desired characteristic (or purpose) is generated. Such learning may be performed through a separate server and/or system, but is not limited thereto, and may be performed in the electronic apparatus 100. Examples of the learning algorithm include, for example, and without limitation, supervised learning, unsupervised learning, semi-supervised learning, transfer learning or reinforcement learning, but are not limited to the examples described above.

Each of the artificial intelligence models may be implemented as, for example, convolutional neural network (CNN), deep neural network (DNN), recurrent neural network (RNN), restricted Boltzmann machine (RBM), deep belief network (DBN), bidirectional recurrent deep neural network (BRDNN) and deep Q-networks, but is not limited to the example described above.

The processor 140 for executing the artificial intelligence model according to an embodiment of the disclosure may be implemented through a combination of a general-purpose processor such as, for example, and without limitation, a general-purpose processor such as a CPU, AP, or a digital signal processor (DSP), a graphics-only processor such as a GPU, a vision processing unit (VPU), or an artificial intelligence-only processor such as an NPU. The processor 140 may control to process input data according to a predefined operation rule or an artificial intelligence model stored in the memory 120. According to another embodiment, when the processor 140 is dedicated processor (or artificial intelligence dedicated processor) the dedicated processor may be designed with a hardware structure specialized for processing a specific artificial intelligence model. For example, hardware specialized for processing a specific artificial intelligence model may be designed as a hardware chip such as an ASIC or FPGA. When the processor 140 is implemented as a dedicated processor, it may be implemented to include a memory for implementing an embodiment of the disclosure, or may be implemented to include a memory processing function for using an external memory.

According to another example, the memory 120 may store information about an artificial intelligence model including a plurality of layers. In this configuration, storing information about the artificial intelligence model may refer to storing various information related to the operation of the artificial intelligence model, for example, information on a plurality of layers included in the artificial intelligence model, information on parameters used in each of the plurality of layers (for example, filter coefficients, bias, etc.).

Figure 10:
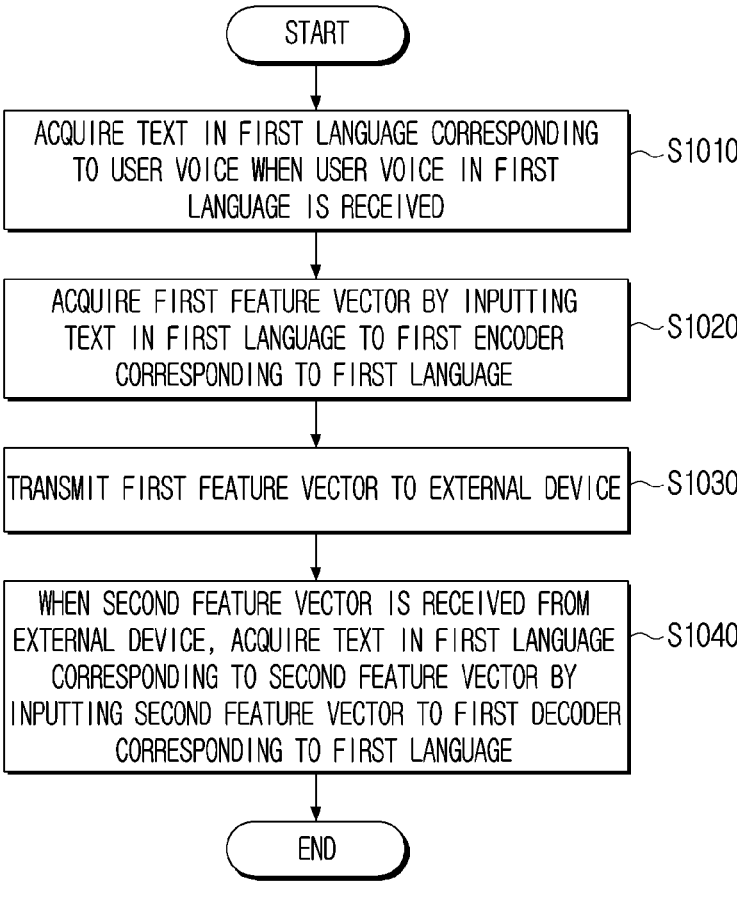
FIG. 10 is a flowchart illustrating a method of controlling an electronic apparatus according to an embodiment.

FIG. 10 is a flowchart illustrating a method of controlling an electronic apparatus according to an embodiment.

A method of controlling an electronic apparatus according to an embodiment of the disclosure may include acquiring, when a user voice in a first language is received, text in the first language corresponding to the user voice (S1010).

A first feature vector may be acquired by inputting the text in the first language to the first encoder corresponding to the first language (S1020).

The first feature vector may be transmitted to the external device (S1030).

When the second feature vector is received from the external device, the text in the first language corresponding to the second feature vector may be acquired by inputting the second feature vector to the first decoder corresponding to the first language (S1040).

The first encoder according to an embodiment may be a model learned using the first text in the first language and the feature vector in a vector space as input data and output data, and a second encoder corresponding to a second language different from the first language, may be a model learned by using, as input data and output data, the second text in the second language having a similarity greater than or equal to a threshold value with the first text, and the feature vector in the vector space.

In addition, the second encoder corresponding to the second language may be included in the external device and output the second feature vector when text corresponding to a user voice in the second language is input.

The first decoder may be a model learned using a feature vector in a vector space and a first text in a first language as input data and output data, and the second decoder corresponding to a second language different from the first language may be a model learned by using, as input data and output data, a feature vector in a vector space and a second text in a second language having a similarity greater than or equal to a threshold value with the first text.

The second decoder corresponding to the second language may be included in the external device and may output text in the second language when the first feature vector received from the electronic apparatus is input.

The control method according to an embodiment may further include identifying whether the external device includes a second decoder corresponding to the second language by performing communication with the external device, and when it is identified that the external device includes the second decoder, transmitting the first feature vector to the external device, and when it is identified that the external device does not include the second decoder, transmitting the first feature vector to the server may be further included.

The control method according to an embodiment may further include acquiring a sound of a first language corresponding to text in the first language and outputting a sound of the first language by using text to speech (TTS).

The control method according to an embodiment may further include compressing a first feature vector based on a compressor, transmitting the compressed first feature vector to an external device through a communication interface, and decompressing the compressed second feature vector based on the decompressor when the compressed second feature vector is received from the external device, and inputting the decompressed second feature vector to the first decoder.

The first encoder and the first decoder according to an embodiment may be included in a neural machine translation (NMT) model, and the neural network machine translation model may acquire a first feature vector by converting text corresponding to the user voice into a vector value when a user voice is input, and convert the second feature vector into text in the first language when the second feature vector is input.

However, various embodiments of the disclosure may be applied to all types of electronic apparatuses configured to receive a voice signal as well as electronic apparatuses.

Various example embodiments described above may be embodied in a recording medium that may be read by a computer or a similar apparatus to the computer using software, hardware, or a combination thereof. In some cases, the embodiments described herein may be implemented by the processor itself. In a software configuration, various embodiments described in the specification such as a procedure and a function may be implemented as separate software modules. The software modules may respectively perform one or more functions and operations described in the disclosure According to various embodiments described above, computer instructions for performing processing operations of the electronic apparatus 100 according to the various embodiments described above may be stored in a non-transitory computer-readable medium. The computer instructions stored in the non-transitory computer-readable medium may cause a particular device to perform processing operations on the sound output device according to the various embodiments described above when executed by the processor of the particular device.

The non-transitory computer readable recording medium may refer, for example, to a medium that stores data and that can be read by devices. For example, the non-transitory computer-readable medium may be CD, DVD, a hard disc, Blu-ray disc, USB, a memory card, ROM, or the like.

It should be understood that embodiments described herein should be considered in a descriptive sense only and not for purposes of limitation. Descriptions of features or aspects within each embodiment should typically be considered as available for other similar features or aspects in other embodiments. While embodiments have been described with reference to the figures, it will be understood by those of ordinary skill in the art that various changes in form and details may be made therein without departing from the spirit and scope as defined by the following claims and their equivalents.

What is claimed is:

1. An electronic apparatus comprising:
a microphone;
a communication interface comprising communication circuitry;
a memory configured to store a first encoder corresponding to a first language and a first decoder corresponding to the first language; and
a processor configured to:
based on a user voice in the first language being received through the microphone, acquire a first text in the first language corresponding to the user voice,
acquire a first feature vector by inputting the first text in the first language to the first encoder,
control the communication interface to transmit the first feature vector to an external device, and
based on a second feature vector being received from the external device through the communication interface, acquire text in the first language corresponding to the second feature vector by inputting the second feature vector to the first decoder,
wherein the external device comprises a second encoder corresponding to a second language, and
wherein the second encoder is configured to output the second feature vector based on a second text corresponding to a user voice in the second language being input.

2. The electronic apparatus of claim 1, wherein the first encoder comprises a model learned based on the first text in the first language as input data and a feature vector on a vector space as output data, and
wherein the second encoder corresponding comprises a model learned based on the second text in the second language having a similarity greater than or equal to a threshold value with the first text as input data and a feature vector in a vector space as output data.

3. The electronic apparatus of claim 1, wherein the first decoder comprises a model learned based on a feature vector on a vector space as input data and the first text in the first language as output data, and wherein a second decoder corresponding to the second language different from the first language comprises a model learned based on a feature vector in a vector space as input data and the second text in the second language having a similarity greater than or equal to a threshold value with the first text as output data.

4. The electronic apparatus of claim 3, wherein the external device includes the second decoder corresponding to the second language, and wherein the second decoder is configured to output text in the second language based on the first feature vector received from the electronic apparatus being input.

5. The electronic apparatus of claim 3, wherein the processor is further configured to:

identify whether the external device includes the second decoder corresponding to the second language by communicating with the external device via the communication interface, based on identifying that the external device includes the second decoder, control the communication interface to transmit the first feature vector to the external device, and based on identifying that the external device does not include the second decoder, control the communication interface to transmit the first feature vector to a server.

6. The electronic apparatus of claim 1, further comprising:

a speaker, wherein the processor is further configured to:

acquire a sound of the first language corresponding to the text in the first language using text to speech, and output the sound of the first language through the speaker.

7. The electronic apparatus of claim 1, wherein the memory further comprises a compressor and a decompressor, wherein the processor is further configured to:

compress the first feature vector based on the compressor, control the communication interface to transmit the compressed first feature vector to the external device, decompress a compressed second feature vector based on the decompressor based on the compressed second feature vector being received from the external device, and input the decompressed second feature vector to the first decoder.

8. The electronic apparatus of claim 1, wherein the first encoder and the first decoder are included in a neural machine translation model, wherein the neural machine translation model is configured to:

based on the user voice being input, acquire the first feature vector by converting the text corresponding to the user voice into a vector value, and based on the second feature vector being input, convert the second feature vector into text in the first language.

9. A method for controlling an electronic apparatus, the method comprising:

based on a user voice in a first language being received, acquiring text in the first language corresponding to the user voice;

acquiring a first feature vector by inputting the text in the first language to a first encoder;

transmitting the first feature vector to an external device; and based on a second feature vector being received from the external device, acquiring text in the first language corresponding to the second feature vector by inputting the second feature vector to a first decoder corresponding to the first language, wherein the external device comprises a second encoder corresponding to a second language, and wherein the second encoder is configured output the second feature vector based on a second text corresponding to the user voice in the second language being input to the second encoder.

10. The method of claim 9, wherein the first encoder comprises a model learned based on the first text in the first language as input data and a feature vector on a vector space as output data, and wherein the second encoder comprises a model learned based on the second text in the second language having a similarity greater than or equal to a threshold value with the first text as input data and a feature vector in a vector space as output data.

11. The method of claim 10, wherein the first decoder comprises a model learned based on a feature vector on a vector space as input data and the first text in the first language as output data, and wherein a second decoder corresponding to the second language different from the first language comprises a model learned based on a feature vector in a vector space as input data and the second text in the second language having a similarity greater than or equal to a threshold value with the first text as output data.

12. The method of claim 11, wherein the external device includes the second decoder corresponding to the second language, and wherein the second decoder is configured to output text in the second language based on the first feature vector received from the electronic apparatus being input.

13. The method of claim 11, further comprising:

identifying whether the external device includes the second decoder corresponding to the second language by communicating with the external device;

based on identifying that the external device includes the second decoder, transmitting the first feature vector to the external device; and based on identifying that the external device does not include the second decoder, transmitting the first feature vector to a server.

14. The method of claim 9, further comprising:

acquiring a sound of the first language corresponding to the text in the first language using text to speech; and outputting the sound of the first language through a speaker.

15. The method of claim 9, further comprising:

compressing the first feature vector based on a compressor;

transmitting the compressed first feature vector to the external device through a communication interface;

decompressing a compressed second feature vector based on a decompressor based on the compressed second feature vector being received from the external device; and inputting the decompressed second feature vector to the first decoder.

16. The method of claim 9, wherein the first encoder and the first decoder are included in a neural machine translation model, wherein the neural machine translation model is configured to:

based on the user voice being input, acquire the first feature vector by converting the text corresponding to the user voice into a vector value; and based on the second feature vector being input, convert the second feature vector into text in the first language.

17. An electronic apparatus comprising:

a microphone;

a communication interface comprising communication circuitry;

a memory configured to store a first encoder and a first decoder corresponding to a first language; and a processor configured to:

based on a user voice in the first language being received through the microphone, acquire a first text in the first language corresponding to the user voice;

acquire a first feature vector by inputting the first text in the first language to the first encoder;

control the communication interface to transmit the first feature vector to an external device;

based on a second feature vector being received from the external device through the communication interface, acquire text in the first language corresponding to the second feature vector by inputting the second feature vector to the first decoder;

identify whether the external device comprises a second decoder corresponding to a second language different from the first language by communicating with the external device via the communication interface;

based on identifying that the external device comprises the second decoder, transmit the first feature vector to the external device; and based on identifying that the external device does not comprise the second decoder, transmit the first feature vector to a server.

18. The electronic apparatus of claim 17, wherein the first decoder comprises a model learned based on a feature vector on a vector space as input data and the first text in the first language as output data, and wherein the second decoder comprises a model learned based on a feature vector in a vector space as input data and a second text in the second language having a similarity greater than or equal to a threshold value with the first text as output data.

\* \* \* \* \*